United States Patent

[11] 3,581,083

| | | |
|---|---|---|
| [72] | Inventor | Ivan L. Joy<br>1616 W. 29th St., Topeka, Kans. 66611 |
| [21] | Appl. No. | 848,922 |
| [22] | Filed | Aug. 11, 1969<br>Division of Ser. No. 665,329, Sept. 5, 1967,<br>Pat. No. 3,461,284. |
| [45] | Patented | May 25, 1971 |

[54] WHEEL TRIP
6 Claims, 4 Drawing Figs.

[52] U.S. Cl. .................................................. 246/246,
250/223B
[51] Int. Cl. ................................................... B61l 1/10
[50] Field of Search .......................................... 250/219
Rg, 221, 223 B; 246/169 D, 246

[56] References Cited
UNITED STATES PATENTS

| Re25,159 | 4/1962 | Johanson et al. ............ | 246/169(D) |
| 3,248,845 | 5/1966 | Schneider ..................... | 250/223(B) |

Primary Examiner—Arthur L. La Point
Assistant Examiner—George H. Libman
Attorney—Hibben, Noyes, and Bicknell ABSTRACT: This disclosure deals with a wheel trip adapted to be mounted adjacent a length of railroad track and to indicate the presence or the passing of the wheels on one side of a train. The wheel trip includes two spaced sensors, means for energizing the two sensors, each of the sensors responding to the presence of a wheel, and means connected in circuit with the sensors for generating a trip signal only when a wheel is adjacent both sensors. A counter and/or a temperature measuring unit may be connected to respond to the trip signal.

INVENTOR
IVAN L. JOY

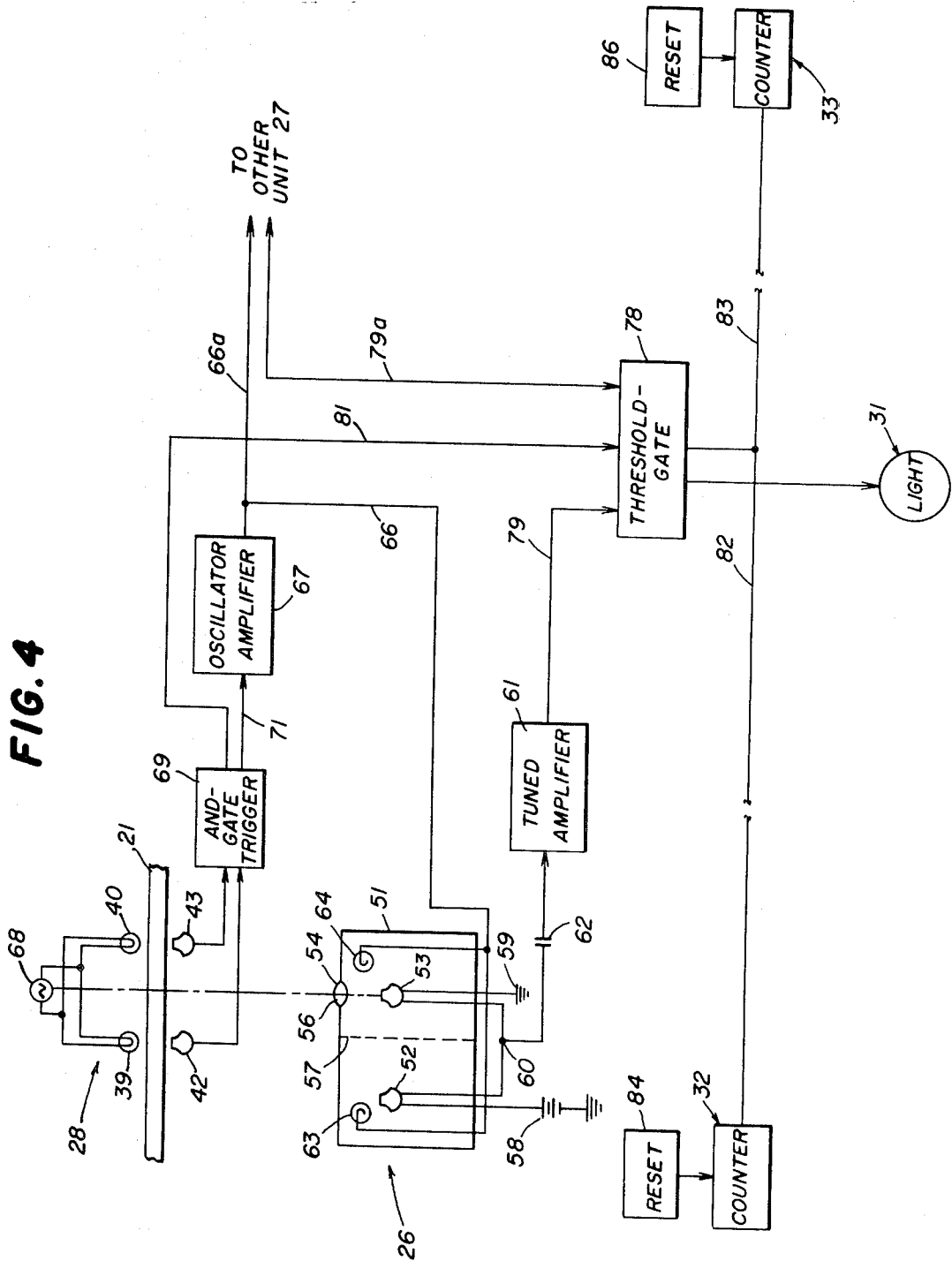

WHEEL TRIP

This application is a division of applicant's copending application Ser. No. 665,329, filed Sept. 5, 1967, entitled "Heat Detecting System," now Pat. No. 3,461,284.

Trips or sensors have been provided in the past to indicate the passing of a solid object or body. For example, wheel trips have been provided to sense the movement of each wheel on one side of a train past a given location, such trips providing a trip signal which is connected to actuate a journal temperature measuring unit or a counter. One such construction includes a photocell as disclosed in Johanson et al. reissue patent No. Re. 25,159, and another construction includes an inductor as disclosed in Gallagher et al. U.S. Pat. No 3,095,171.

A disadvantage of a photocell wheel trip as disclosed in the Johanson et al. patent is that it is not possible readily to adjust the duration of a trip signal provided by it. A disadvantage of an inductor wheel trip as disclosed in the Gallagher et al. patent is that it is operable only when the train is moving in excess of a predetermined speed, it being necessary for a wheel to be moving relatively rapidly in order to induce a signal in the inductive circuit of such a trip.

In accordance with the present invention, an improved trip is provided, including two spaced apart sensors, means for energizing said sensors in the absence of an object, such as a wheel, each of said sensors changing its characteristics when an object is adjacent it, means connected to said sensors and responsive to said change in characteristics for generating a trip signal which actuates a device such as a counter to indicate the number of wheels passing thereby and/or a device such as a journal temperature measuring unit. The trip signal is generated only when an object is simultaneously adjacent both sensors, and therefore the length of the trip signal may be adjusted by adjusting the spacing between the sensors relative to the dimensions of the object.

Objects and advantages of the invention will become apparent from the following description taken in conjunction with the accompanying FIGS. of the drawings, in which:

FIG. 4 is a schematic electrical diagram showing the wheel trip.

Figure 1:
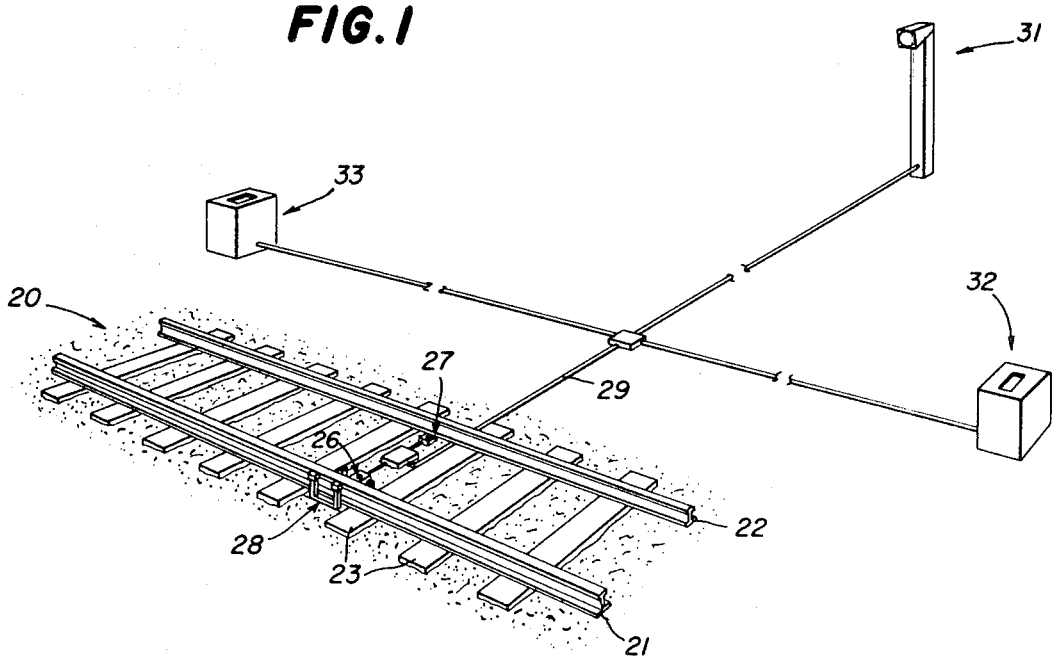
FIG. 1 is a perspective view of a heat detecting system including a wheel trip embodying the invention.

FIGS. 1 through 4 show a heat detecting system including a wheel trip embodying the invention. The heat detecting system is installed at a track side location and is adapted to detect the temperatures of the journals of passing trains and provide a signal when the temperature of a journal exceeds a predetermined safe value. With reference to FIG. 1, the reference numeral 20 indicates a section of railroad track including rails 21 and 22 which are supported by wooden ties 23. The detecting system includes two heat detector units 26 and 27 mounted between the rails 21 and 22 and between a pair of the ties 23, and the wheel trip 28 is mounted adjacent the units 26 and 27 and has portions on opposite sides of the rail 21. The two detector units 26 and 27 and the wheel trip 28 are electrically connected by conductors in a cable 29 to an indicator 31 and to two counters 32 and 33. The indicator 31 is preferably located adjacent the two detector units 26 and 27 but laterally displaced a short distance from the track 20, and the two counters 32 and 33 are preferably mounted at locations down the track in opposite directions from the two detector units 26 and 27.

During the operation of the system, a train moving along the track 20 passes the two detector units 26 and 27 which sense the heat of the two journals at the opposite ends of each axle. When a journal has a temperature higher than a predetermined safe value, one of the detector units generates a signal which is passed to the indicator 31. At the same time, activating signals are passed to and start up the two counters 32 and 33, and thereafter each axle passing the detectors 26 and 27 results in the wheel trip 28 generating a signal which is passed to the counters 32 and 33 and counted. Subsequently, a trainman riding in the caboose at the rear end of a train will receive the signal from the indicator 31 when the caboose passes the indicator 31, and he may then signal for the train to stop. The trainman can then walk to the adjacent one of the two counters 32 and 33, depending upon the direction of movement of the train, and look at the reading of the counter to determine the number of axles which passed the detector units after the hot journal passed the units. The trainman may then personally inspect the hot journal by counting from the end of the train forwardly a number of axles corresponding to the reading of the counter and make a personal determination of whether the train should be stopped for repairs or whether the train may cautiously continue. The system may also include means, as will be described hereinafter, for manually resetting the system by the trainman after taking a reading of a counter. When a train does not have a hot journal present and therefore does not stop, an automatic reset mechanism is preferably provided for resetting the system in preparation for a subsequent train.

Figure 2:
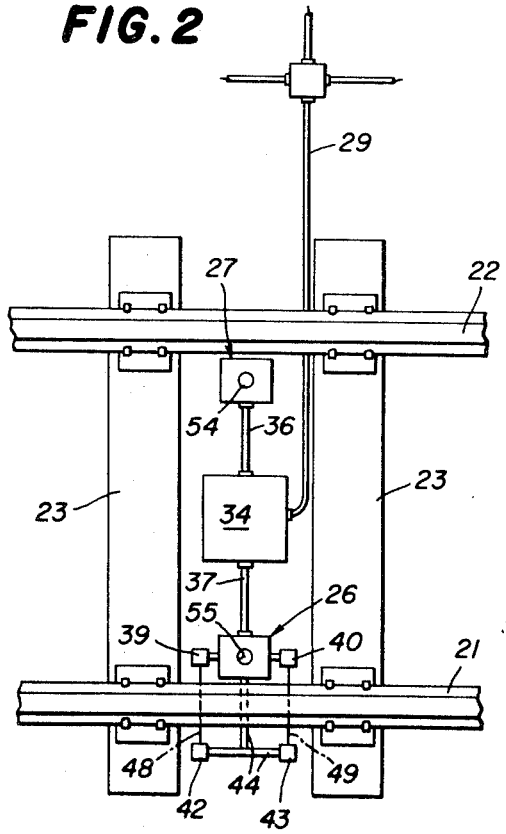
FIG. 2 is a plan view of a portion of the wheel trip shown in FIG. 1.
Figure 3:
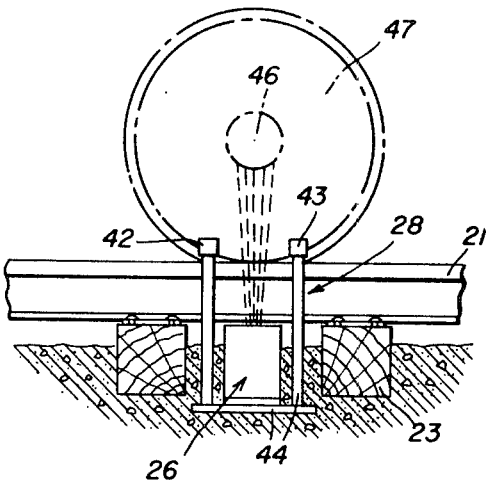
FIG. 3 is a side elevational view of the portion of the wheel trip shown in FIG. 2.

With reference to FIGS. 2 and 3, the two detector units 26 and 27 are preferably mounted adjacent the inner sides of the rails 21 and 22, respectively. A box 34 for electrical components may be located between the two units 26 and 27, and the two units 26 and 27 and the box 34 are preferably secured together as by braces or electrical conduits 36 and 37. The two units 26 and 27 and the box 34 are preferably buried in the soil between the ties such that they are held in lateral alignment relative to the rails 21 and 22.

The wheel trip 28 includes two lights 39 and 40 located on one side of the rail 21 and two sensors in the form of photoelectric cells 42 and 43 located on the opposite side of the rail 21, the photoelectric cells and the lights preferably being secured, as by straps or brackets 44, to the housing for the unit 26 in order to hold the wheel trip 28 in lateral alignment with the two units 26 and 27.

As previously stated, the two detector units 26 and 27 are aligned laterally of the rails 21 and 22, and the wheel trip 28 is located symmetrically with respect to the center line or viewing axis of the two detecting units 26 and 27. FIG. 3 shows in dashed lines an axle 46 and a wheel 47 associated therewith. As shown in FIG. 3, the viewing axes of the two units 26 and 27 are vertical, and the two detector units 26 and 27 are focused on the respective opposite ends of the axle 46 as it passes. It has been found that the temperature of each end portion of an axle gives an accurate indication of the temperature of the associated journal.

With reference to FIGS. 2 and 3, the photoelectric cell 42 of the wheel trip 28 receives radiation from the light 39 along a light path 48, and, similarly, the photoelectric cell 43 receives radiation along a light path 49 from the light 40. The distances, lengthwise of the track, between the photoelectric cells 42 and 43 and the associated lights 39 and 40, and their vertical distance above the head of the rail 21 are such that both light paths 48 and 49 are simultaneously broken by a wheel 47 when the axle 46 is directly over the heat detector units 26 and 27. The light paths 48 and 49 are simultaneously broken and the wheel trip 28 starts to produce a trip signal after the axle enters the field of view of the units 26 and 27, and the wheel 47 passes one of the two light paths and thus terminates the trip signal before the axle leaves the field of view of the units 26 and 27. The units 26 and 27 preferably view approximately a 3 inch long area on the underside of each end of the axle 46 during the period of the trip signal.

FIG. 4 illustrates a portion of the system, including the detector unit 26 and the wheel trip 28. The detector unit 27 is identical with the unit 26 and therefore is not illustrated in detail. The unit 26 comprises a housing 51 and two infrared sensitive electrical elements 52 and 53 within the housing, each element having a characteristic which varies with the amount of heat received by it. These two elements 52 and 53 may, for example, be lead selenide cells or lead sulfide cells, the resistances of which are proportional to their temperatures. A viewing aperture 54 if formed in the top wall of the housing 51 and an infrared lens 56 is mounted adjacent the aperture 54 such that infrared radiation passing through the aperture 54 is focused on the element 53. The other element 52 is mounted in the housing 51 such that it does not receive infrared radiation through the aperture 54, and a shield 57 may be mounted between the element 52 and the aperture 54 for this purpose.

The two elements 52 and 53 are electrically connected in series between the positive potential terminal of a DC source 58 and a ground connection 59. An output signal is taken at a terminal 60 between the two elements 52 and 53 and passed to a high gain amplifier 61 through a capacitor 62.

Also mounted within the housing 51 is an auxiliary radiation means for modulating the output signal. The auxiliary radiation means comprises two lamps 63 and 64 which are respectively positioned adjacent the elements 52 and 53. The lamps are similarly located relative to their associated elements so that the element 52 receives the same amount of radiation from the lamp 63 as the element 53 receives from the lamp 64 when the two lamps 63 and 64 are energized. The element 53 also simultaneously receives radiation through the viewing aperture 54 as previously explained.

Instead of the two lamps 63 and 64, the modulating means could comprise a single lamp positioned relative to the two elements 52 and 53 such that the two elements receive identical amounts of radiation from the single lamp.

The two lamps 63 and 64 are connected in parallel to a conductor 66 to receive energizing alternating current from an oscillator-amplifier circuit 67 which produces sufficient alternating current signal at, for example, 5,000 c.p.s. to simultaneously energize both lamps 63 and 64. The oscillator-amplifier 67 is turned on by the wheel trip 28 which includes the two lamps 39 and 40 and the two photocells 42 and 43, previously described. While a train is moving past the system, the two lamps 39 and 40 of the wheel trip are continuously energized by an oscillator 68 which produces, for example, a 400 c.p.s. sine wave. The two photocells 42 and 43 are connected to the input of an "AND-gate" trigger circuit 69 which produces the trip signal previously referred to on a conductor 71 whenever the light paths to the photocells 42 and 43 are simultaneously broken. The conductor 71 is connected to a bias electrode of the oscillator-amplifier circuit 67 such that the oscillator-amplifier is biased on only in the presence of the trip signal.

Thus, each time a wheel passes the wheel trip 28, both light paths to the photocells 42 and 43 are simultaneously broken, the trigger circuit 69 produces a trip-signal, the oscillator-amplifier 67 is biased on, and the two lamps 63 and 64 are momentarily energized. The two lamps 63 and 64 are types which can be turned on and off very quickly. They are, for example, incandescent lamps having filaments of very low mass, which are capable of being heated and then cooling off at the frequency of the oscillator-amplifier 67. The lamps 63 and 64 are energized and deenergized once for each half-cycle of a sine wave, and therefore they will be turned on and off 10,000 times per second when the frequency of the oscillator-amplifier 67 is 5,000 c.p.s.

When a train is passing the system but an axle is not directly over the unit 26, the wheel trip 28 is not actuated and the two lamps 63 and 64 are not energized. The element 53 receives radiation from ambient bodies such as the underside of a box car and the element 52 is shielded from such radiation. Direct current from the direct current source 58 flows through the two elements 52 and 53 which act as variable resistors, and the elements 52 and 53 are matched so that the voltage drops across them are equal. A variable resistor (not shown) may be connected in series with one of two elements 52 and 53 if necessary to match them. Due to the resistance balance, the DC voltage at the terminal 60 will normally be one-half that of the DC source 58. The capacitor 62 blocks the DC from the amplifier 61 and consequently the signal input to the amplifier 61 is normally zero volts.

An axle moving past the unit 26 causes the resistance of the element 53 to drop somewhat because the ends of an axle are heated by the journals and are therefore normally hotter than the underside of a car, and the voltage at the terminal 60 also drops a corresponding amount. The result is a change in the voltage at the terminal 60 having an amplitude which is proportional to the temperature of the end of the axle being viewed by the unit 26.

The foregoing arrangement of the two elements 52 and 53 in a balanced circuit is also advantageous in that variations in the ambient temperature do not modify the operating characteristics of the circuit in any way.

At the same time that the axle 46 is over the unit 26, one of the wheels 47 associated with the axle actuates the wheel trip 28 and thereby energizes the lamps 63 and 64. While the two lamps 63 and 64 are energized, the two elements 52 and 53 receive equal amounts of radiation from the lamps 63 and 64, respectively, and such radiation is in phase because the lamps are connected in parallel. Consequently, the resistances of the two elements 52 and 53 vary in phase due to the lamps, the resistance of the element 53 simultaneously varying due to the heat of the axle.

Thus, the voltage at the terminal 60 includes a varying DC component which is representative of the temperatures of the objects being viewed by the element 53 and also includes, when an axle is over the unit 26, an AC component which is due to the modulating lamps 63 and 64. If the resistances of the two elements 52 and 53 were equal, the AC component at the terminal 60 would be zero because the resistances of the two elements 52 and 53 vary in amplitude and, consequently, the percentages of the overall voltage drop on both sides of the terminal 60 would always be equal or balanced. However, when the resistance of the element 53 drops, as when an axle is being viewed, the balanced resistance condition no longer exists and the AC component at the terminal 60 has a finite magnitude. This finite AC component has an amplitude which is proportional to the extent of the resistance unbalance which in turn is proportional to the temperature of the end of the axle being viewed by the element 53, and the AC component passes through the capacitor 62 and is amplified by the amplifier 61. The DC component is of course blocked by the capacitor 62. It is preferred that the amplifier be turned to the frequency of the AC component, but this is not necessary.

As previously mentioned, the other detector unit 27 is identical with the detector unit 26 and views the opposite end of the axle from the end being viewed by the unit 26, and consequently the two units 26 and 27 simultaneously take readings of the opposite ends of every axle passing the units. The wheel trip 28 is connected to energize the modulating lamps 63 and 64 of both units 26 and 27, a conductor 66a connecting the output of the oscillator-amplifier 67 to the lamps of the unit 27 and the conductor 66 leading to the lamps of the unit 26. The electrical signal from the amplifier 61 of the unit 26 is connected by a conductor 79 to the input of a threshold-gate circuit 78, and the output of the amplifier in the unit 27 which corresponds to the amplifier 61 of the unit 26 is connected by another conductor 79a to another input to the threshold-gate circuit 78. The threshold-gate 78, which has a conventional construction, produces a trip signal when the amplitude of a signal on either of the conductors 79 or 79a exceeds a predetermined threshold level. The threshold level is adjusted such that it corresponds to the upper limit of the safe operating temperature range of a journal. Thus, a signal on one of the conductors 79 and 79a exceeding the threshold value indicates that a journal is excessively hot. The trip signal generated in the threshold-gate 78 is connected to energize the indicator 31 which is laterally offset from the track 20 a short distance and is preferably elevated above ground level by a post, as shown in FIG. 1, so that it may be easily viewed by a trainman in the caboose of a passing train. The indicator 31 is preferably a white light and, when energized, constitutes a signal to the trainman that a journal on the train is excessively hot and that he should consider stopping the train to inspect the journal. Of course, if the indicator 31 is off, the trainman is informed that all of the journals on the train are running at safe operating temperatures.

The AND-gate trigger circuit 69 is also connected by a conductor 81 to another input to the threshold-gate 78, and at the same time that a signal on one of the two conductors 79 and 79a energizes the indicator 31, the gate is opened and the trigger signals appearing on the conductor 81 are passed through the gate to a pair of conductors 82 and 83 which lead to the two counters 32 and 33, respectively. Thereafter, each trigger signal generated by the trigger circuit 69 is passed through the gate 78 and is counted by both counters 32 and 33 until the last car on the train passes the wheel trip 28. Consequently, the readings on the two counters 32 and 33 indicate the number of wheels which have passed the wheel trip 28 after an excessively hot journal has been detected by one of the two units 26 and 27. The two counters 32 and 33 preferably include reset mechanisms 84 and 86, respectively, which may be manually actuated by a trainman after he takes a reading of one of the two counters 32 and 33 to reset the two counters and to turnoff the indicator 31. The two mechanisms preferably also include timers which automatically reset the two counters 32 and 33 and turnoff the indicator 31 approximately 15 minutes, for example, after the indicator 31 has been turned on in the event the trainman decides to stop the train and actuate the manual reset.

The system may be powered in any manner desired. For example, the system may be energized by a DC source including a 24 volt battery and a regulator which regulates the output voltage of the battery to 20 volts DC. The DC source 58 represents schematically the combination of such a battery and regulator. In such a power supply, the AC source 68 would include a chopper connected to the output of the regulator. The system including the wheel trip may be left on continuously or a conventional trip mechanism (not shown) may be provided to automatically turn on the system when a train approaches from either direction and then turn the system off a predetermined time after the train has passed.

The construction of the wheel trip is highly advantageous since there are no parts capable of wearing out due to repeated contact by the wheel of a train. Further, the distance between the light paths of the wheel trip may be adjusted to obtain exactly the length of trip signal desired, and the photocells do not depend on a minimum train speed for energization.

I claim:

1. In a system for detecting the temperature of journals of a moving train, the improvement comprising a wheel trip for producing a trip signal each time a wheel passes, said wheel trip comprising first and second longitudinally spaced photocells mounted on one side of the track on which said wheels travel, first and second lights mounted on the opposite side of said track, said first and second photocells receiving light along first and second light paths from said first and second lights, respectively, and circuit means connected to said photocells for producing a trip signal during the time duration when said light paths are simultaneously broken, said time duration of said trip signal being a function of said spacing and the rate of movement of said wheels.

2. Apparatus as in claim 1, and further including circuit means connected to receive said trip signal and to be actuated thereby only in the presence of said trip signal.

3. A signal generating system responsive to each of a series of wheels of a train moving along the rails of a track, said system comprising sensor means forming first and second sensor paths, said sensor paths crossing one of said rails and being separated in the direction of said rails by a predetermined space, circuit means connected to said sensor means and responsive to the interruption of said sensor paths for generating a signal during the time duration when one of said wheels simultaneously interrupts both of said sensor paths, said time duration being equal to the time required for said one wheel to move a distance equal to the width of said wheel less said space between said sensor paths, whereby said time duration is a linear function of the velocity of said wheel for a given spacing and may be made relatively short by making said spacing slightly less than said width.

4. Apparatus as in claim 3, wherein said sensor means comprises first and second light sources adapted to be positioned on one side of said rail and a photocell associated with each of said light sources and adapted to be positioned on the opposite side of said rail, said photocells and light sources forming said first and second sensor paths therebetween.

5. Apparatus as in claim 3, and further including circuit means connected to receive said signal and to be actuated thereby only in the presence of said signal.

6. Apparatus as in claim 5, wherein said circuit means includes an infrared detector for sensing the temperatures of journals of said train.